W. L. PETERSON.
CHURN.
No. 174,640. Patented March 14, 1876.
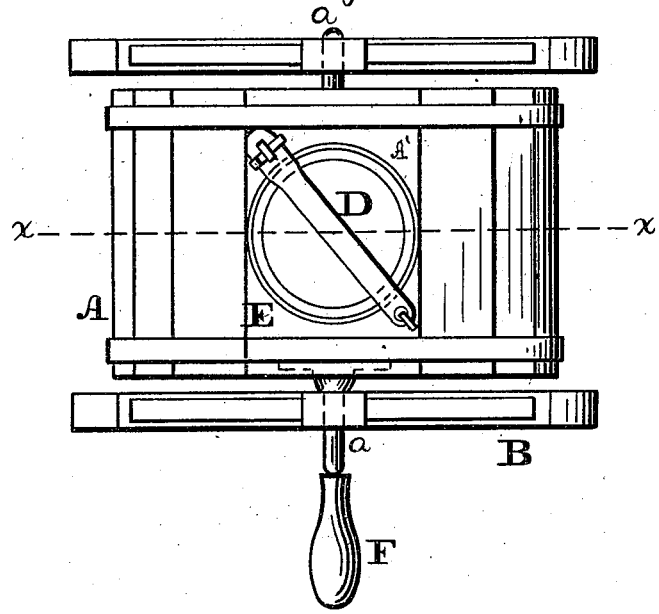
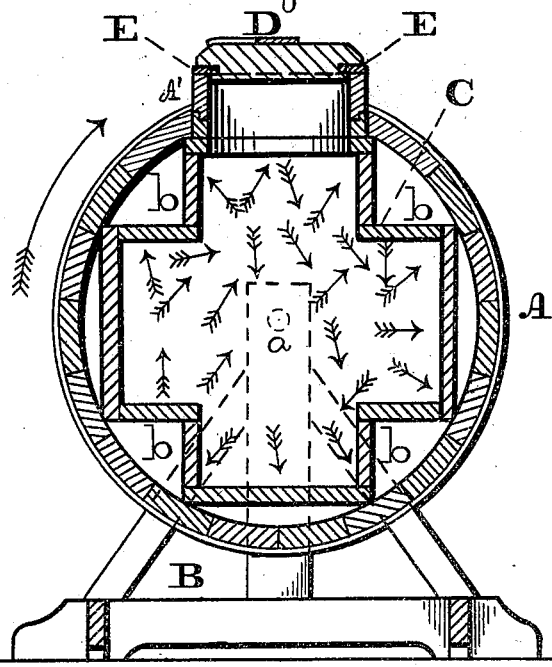
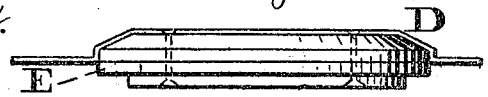
Witnesses:
Lewis F. Brous
A. P. Grant
Inventor:
Wm L. Peterson
by John A. Wiederhein
Atty

UNITED STATES PATENT OFFICE.

WILLIAM L. PETERSON, OF ATLANTIC CITY, ASSIGNOR TO AMANDA L. WAGGONER, OF BRIDGEPORT, NEW JERSEY.

IMPROVEMENT IN CHURNS.

Specification forming part of Letters Patent No. 174,640, dated March 14, 1876; application filed September 16, 1875.

*To all whom it may concern:*

Be it known that I, WILLIAM L. PETERSON, of Atlantic City, in the county of Atlantic and State of New Jersey, have invented a new and useful Improvement in Churns; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a top or plan view of the churn embodying my invention. Fig. 2 is a longitudinal vertical section thereof in line $x\,x$, Fig. 1. Fig. 3 is a side view of a detached portion.

Similar letters of reference indicate corresponding parts in the several figures.

My invention consists of a churn-body in the form of a Greek cross, with one of its limbs extending through an exterior cylinder and capped, the whole pivoted centrally, and adapted to revolve. By this construction, also, the churn may be discharged in a most convenient and thorough manner.

Referring to the drawings, A represents the exterior cylinder of the body of a rotary churn, whose axis $a$ is mounted on a suitable frame, B. The body A, internally, is of the form of a Greek cross, C, which is constructed of a series of walls, $b$, continuous of each other, and which are disposed at right angles to each other, so as to form the cross-shaped structure, as shown in Fig. 2, the inner face presenting twelve right angles. The upper walls $b$ are continued outside of the body A, so as to form a spout, A', and the mouth thereof is covered by a lid or cap, D, which consists of two disks, between which is clamped a rubber band or gasket, E, for forming a tight joint between the lid and the walls surrounding the opening leading into the dasher. A hasp, staple, and key, or other appliances, will be employed for holding the lid in its closed position.

The operation is as follows: The lid being opened, cream is admitted into the body, and the lid then closed and fastened. Power will be applied to the body A by means of a crank-handle, F, pulley, or otherwise, so as to impart a rotary motion to the churn-body.

The rotation of the dasher in the direction of the arrow shown on the outside of the body A causes the cream to be lifted on one side, forced down on the other side, and pushed horizontally, and as the motion continues the cream will be dashed toward the various right angles, and redashed in right-lined and oblique directions, upward, downward, and laterally, right and left, and from wing to wing, opposite to each other, and in the direction diametrically opposite to each other, so that the cream will be forced against a multiplication of the angles of the dasher, and in so many conflicting passages that the butter will soon come and readily gather, without leaving a particle thereof in the cream.

The butter can be easily removed by opening the lid D, whereby access is had to the interior of the hollow dasher, in which case the churn will be overturned and the contents thereof will run out, the walls $b$ offering no obstruction thereto. The spout A' also provides means of pouring out the buttermilk without removing the butter, when so desired.

Having thus described my invention, what I claim as new, and desire to secure by Letters Patent, is—

A churn consisting of a churn-body in the form of a Greek cross, with one of its limbs extending through an exterior cylinder and capped, the whole pivoted centrally, and adapted to revolve, as and for the purposes specified.

WILLIAM L. PETERSON.

Witnesses:
JOHN A. WIEDERSHEIM,
JNO. A. BELL.